(12) United States Patent
Lee (10) Patent No.: US 9,723,646 B2
(45) Date of Patent: Aug. 1, 2017

(54) LTE+CDMA 1X HYBRID

(71) Applicant: Intel Corporation, Santa Clara, CA (US)

(72) Inventor: Anthony S. Lee, San Diego, CA (US)

(73) Assignee: Intel Corporation, Santa Clara, CA (US)

( * ) Notice: Subject to any disclaimer, the term of this patent is extended or adjusted under 35 U.S.C. 154(b) by 77 days.

(21) Appl. No.: 14/168,679

(22) Filed: Jan. 30, 2014

(65) Prior Publication Data

US 2014/0219247 A1 Aug. 7, 2014

Related U.S. Application Data

(60) Provisional application No. 61/761,097, filed on Feb. 5, 2013.

(51) Int. Cl.
*H04W 88/06* (2009.01)
*H04W 76/02* (2009.01)
(Continued)

(52) U.S. Cl.
CPC ......... *H04W 76/026* (2013.01); *H04W 28/06* (2013.01); *H04W 36/14* (2013.01);
(Continued)

(58) Field of Classification Search
CPC ..... H04W 36/14; H04W 36/30; H04W 36/26; H04W 88/06; H04W 36/0022; H04W 76/026; H04W 76/048
(Continued)

(56) References Cited

U.S. PATENT DOCUMENTS

| | | | | |
|---|---|---|---|---|
| 6,671,287 | B1* | 12/2003 | Huttunen | H04W 28/06 370/465 |
| 2009/0116447 | A1* | 5/2009 | Balasubramanian | H04W 36/14 370/331 |
| 2012/0270545 | A1* | 10/2012 | Zhao | H04W 72/00 455/435.1 |

FOREIGN PATENT DOCUMENTS

| | | |
|---|---|---|
| CN | 1270743 A | 10/2000 |
| CN | 102037762 A | 4/2011 |
| CN | 102364976 A | 2/2012 |

OTHER PUBLICATIONS

Office Action received for Chinese Patent Application No. 201410042862.0, mailed on Nov. 3, 2016, 6 pages of Chinese Office Action Only.

(Continued)

*Primary Examiner* — Jae Y Lee
*Assistant Examiner* — Jean F Voltaire
(74) *Attorney, Agent, or Firm* — Schiff Hardin LLP (57) ABSTRACT

An apparatus for communicating over a circuit switched network and a packetized data network. The apparatus includes a packetized data modem, a circuit switched modem, and a hybrid processor. The packetized data modem is configured to communicate with the packetized data network over a packetized data radio link via a radio. The circuit switched modem is configured to communicate with the circuit switched network over a circuit switched radio link via the radio. The hybrid processor is configured to monitor a circuit switched sleep cycle and a packetized data sleep cycle, and is configured to direct the packetized data modem and the circuit switched modem to switch between the networks according to the sleep cycles by prioritizing communications with the circuit switched network above communications with the packetized data network.

21 Claims, 6 Drawing Sheets

(51) Int. Cl.

| | |
|---|---|
| *H04W 36/14* | (2009.01) |
| *H04W 68/12* | (2009.01) |
| *H04W 72/04* | (2009.01) |
| *H04W 72/00* | (2009.01) |
| *H04W 36/26* | (2009.01) |
| *H04W 92/02* | (2009.01) |
| *H04W 88/14* | (2009.01) |
| *H04W 28/06* | (2009.01) |
| *H04L 5/00* | (2006.01) |
| *H04W 36/30* | (2009.01) |
| *H04W 84/04* | (2009.01) |
| *H04W 76/04* | (2009.01) |

(52) U.S. Cl.
CPC ........... *H04W 36/26* (2013.01); *H04W 68/12* (2013.01); *H04W 72/00* (2013.01); *H04W 72/04* (2013.01); *H04W 72/048* (2013.01); *H04W 88/14* (2013.01); *H04W 92/02* (2013.01); *H04L 5/0092* (2013.01); *H04W 36/30* (2013.01); *H04W 76/048* (2013.01); *H04W 84/04* (2013.01); *H04W 88/06* (2013.01)

(58) Field of Classification Search
USPC .................................................. 370/329–332
See application file for complete search history.

(56) References Cited

OTHER PUBLICATIONS

3GPP, "Circuit Switched (CS) Fallback in Evolved Packet System (EPS)", Stage 2, Version 10.2.1, TS 23.272, 2011, 79 pages.

3GPP2, "E-UTRAN-cdma2000 1x Connectivity and Interworking Air Interface Specification", Version 2.0, C.S0097-0, Apr. 2011, 66 pages.

* cited by examiner

FIG. 1 (Prior Art)
SINGLE RADIO DUAL MODE CELLULAR ARCHITECTURE

FIG. 2

HYBRID DUAL MODE CELLULAR ARCHITECTURE

1X PAGE MONITORING METHOD IN LTE CONNECTED STATE

LTE+CDMA 1X HYBRID

CROSS-REFERENCE TO RELATED APPLICATIONS

This application claims the benefit of the following U.S. Provisional Application, which is herein incorporated by reference for all intents and purposes.

| SERIAL NUMBER | FILING DATE | TITLE |
|---|---|---|
| 61/761,097 (VTU.13-0005-US) | Feb. 5, 2013 | LTE + CDMA 1X HYBRID |

BACKGROUND OF THE INVENTION

Field of the Invention

This invention relates in general to the field of cellular communications, and more particularly to a mechanism for communicating over two disparate radio bands to two disparate networks by employing a single radio dual mode cellular device.

Description of the Related Art

The cell phone industry is undergoing exponential growth, not only in this country, but all over the world. In fact, it is well known that the over twenty percent of the adult population in the United States do not even have a traditional landline telephone. In addition to those who do not own a conventional telephone, nearly ninety percent of the adult population owns a wireless phone.

And the usage of cell phones is increasing as well over the use of traditional landline telephone coverage. In fact, one in seven adults now uses only cell phones. Whereas in the past cell phones were used when a landline was not available or under emergency conditions, lower carrier rates, affordability of family packages, and free mobile-to-mobile or friend-to-friend promotions have fostered in significant increases in usage. It is not uncommon today to walk into any public forum or facility and notice a majority of the people there talking on their cell phones.

The ability to communicate using a mobile phone, or mobile station, has been available since the middle of the last century. However, during the 1990's so-called "2G" or second generation mobile phone systems were provided that began the growth in both deployment and usage that we currently enjoy today. These initial systems predominately provided for the routing and reliable servicing of voice calls between parties. And, as one skilled in the art will appreciate, there are a number of timing and latency requirements associated with transmission and reception of voice data in order to maintain quality of service. As such, so-called circuit switched voice links have been fielded that guarantee this quality of service.

And although wireless cellular network technologies have continued to provide improvements related to the ability to process voice calls, there has also been an enormous pull on the industry to provide for the reliable and efficient transfer of packetized data. As a result, the incremental developments in high speed packetized data networks have not always tracked with the development of voice networks. It is a goal within the industry to field a more unified solution that would provide both reliable voice and high speed data access, however, the industry is not at that point presently. Consequently, it is common practice to field a mobile system that provides for voice communications over one type of circuit switched network, say CDMA2000 1×RTT (hereinafter referenced as "1×"), and high speed data communications over another type of network, say Long Term Evolution (LTE), which provides exclusively for packetized data and does not provide the quality of service that users prefer to support voice communications. In the near future, this type of "dual mode" solution will be prevalent within the art.

In order to field a dual mode system, designers are forced to develop protocols for those instances where two or more co-fielded networks create conflict, or where two or more co-fielded networks are required to interoperate.

This application deals with one such instance, that is, the switching between a high speed data network that provides exclusively for packetized data communications over to a circuit switched voice network in order to process and incoming or outgoing call or other circuit switched event, and more specifically, how such switching is disadvantageously affected because current techniques call for utilizing a back end interworking solution that bridges circuit switched notifications through a packetized data "tunnel" in order to communicate these notifications to a mobile station, or worse, providing a mobile station that has two radios.

In particular, protocols exist for fallback to a circuit switched network during a high speed data session in order to process an incoming or outgoing call. Most present day techniques follow a form of "tunneling," where notification data associated with the call is encapsulated into a sequence of data units that are exchanged over the packetized data network. And while effective, the present inventors have noted that special purpose hardware and programming is required as part of the overall architecture in order to provide this capability. Having a mobile station with two-radios inside eliminates the need for the special purpose tunneling mechanisms, but as one skilled in the art will appreciate, such a mobile station would be bigger, it would be less reliable, and most importantly, it would significantly reduce battery life.

Accordingly, what is needed is a technique that would allow a mobile station having one radio to interoperate with both a circuit switched network, and a packetized data network, without requiring special purpose tunneling mechanisms between the two networks.

SUMMARY OF THE INVENTION

The present invention, among other applications, is directed to solving the above-noted problems and addresses other problems, disadvantages, and limitations of the prior art.

The present invention provides a superior technique for employing a single radio to communicate over both a circuit switched network and a packetized data network. In one embodiment, an apparatus is provided, for communicating over a circuit switched network and a packetized data network. The apparatus includes a packetized data modem, a circuit switched modem, and a hybrid processor. The packetized data modem is configured to communicate with the packetized data network over a packetized data radio link via a radio. The circuit switched modem is configured to communicate with the circuit switched network over a circuit switched radio link via the radio. The hybrid processor is configured to monitor a circuit switched sleep cycle and a packetized data sleep cycle, and is configured to direct the packetized data modem and the circuit switched modem to switch between the networks according to the sleep cycles by prioritizing communications with the circuit switched network above communications with the packetized data network.

One aspect of the present invention contemplates an apparatus for communicating over a circuit switched network and a packetized data network. The apparatus includes a dual mode mobile station having a single radio. The dual mode mobile station includes a packetized data modem, a circuit switched modem, and a hybrid processor. The packetized data modem is configured to communicate with the packetized data network over a packetized data radio link via the single radio. The circuit switched modem is configured to communicate with the circuit switched network over a circuit switched radio link via the single radio. The hybrid processor is configured to monitor a circuit switched sleep cycle and a packetized data sleep cycle, and is configured to direct the packetized data modem and the circuit switched modem to switch between the networks according to the sleep cycles by prioritizing communications with the circuit switched network above communications with the packetized data network.

Another aspect of the present invention comprehends a method for communicating over a circuit switched network and a packetized data network. The method includes: via a packetized data modem, first employing a single radio to communicated with the packetized data network over a packetized data radio link; via a circuit switched modem, second employing the single radio to communicate with the circuit switched network over a circuit switched radio link; and via a hybrid processor, monitoring a circuit switched sleep cycle and a packetized data sleep cycle, and direct the packetized data modem and the circuit switched modem to switch between the networks according to the sleep cycles by prioritizing communications with the circuit switched network above communications with the packetized data network.

BRIEF DESCRIPTION OF THE DRAWINGS

These and other objects, features, and advantages of the present invention will become better understood with regard to the following description, and accompanying drawings where.

DETAILED DESCRIPTION

Exemplary and illustrative embodiments of the invention are described below. In the interest of clarity, not all features of an actual implementation are described in this specification, for those skilled in the art will appreciate that in the development of any such actual embodiment, numerous implementation specific decisions are made to achieve specific goals, such as compliance with system-related and business related constraints, which vary from one implementation to another. Furthermore, it will be appreciated that such a development effort might be complex and time-consuming, but would nevertheless be a routine undertaking for those of ordinary skill in the art having the benefit of this disclosure. Various modifications to the preferred embodiment will be apparent to those skilled in the art, and the general principles defined herein may be applied to other embodiments. Therefore, the present invention is not intended to be limited to the particular embodiments shown and described herein, but is to be accorded the widest scope consistent with the principles and novel features herein disclosed.

The present invention will now be described with reference to the attached figures. Various structures, systems, and devices are schematically depicted in the drawings for purposes of explanation only and so as to not obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase (i.e., a definition that is different from the ordinary and customary meaning as understood by those skilled in the art) is intended to be implied by consistent usage of the term or phrase herein. To the extent that a term or phrase is intended to have a special meaning (i.e., a meaning other than that understood by skilled artisans) such a special definition will be expressly set forth in the specification in a definitional manner that directly and unequivocally provides the special definition for the term or phrase.

Figure 1:
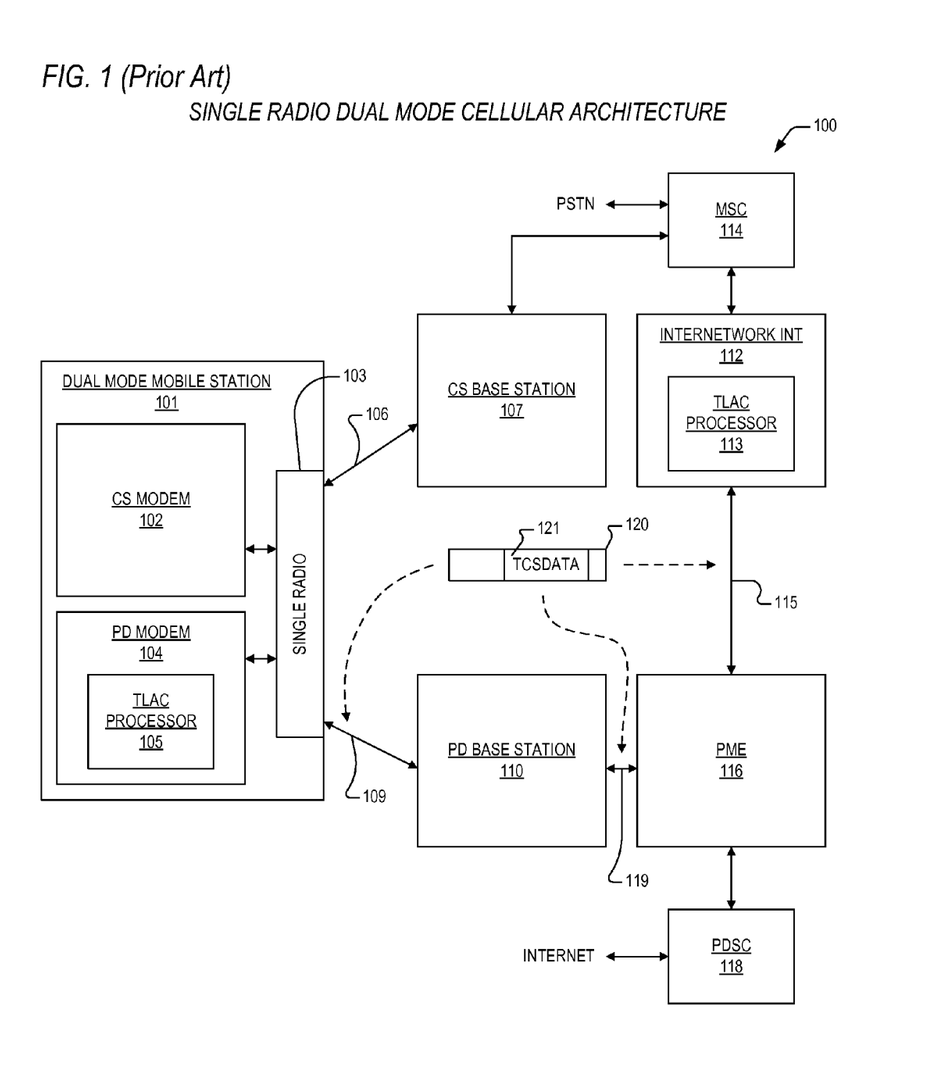
FIG. 1 is a block diagram illustrating a present day single radio dual mode cellular architecture.

In view of the above background discussion on CDMA2000 inter radio access interworking and associated techniques employed within a corresponding system to provide for signaling transactions for 1× circuit switched notifications to/from a mobile station, a discussion of the limitations associated with present day mechanisms will be presented within reference to FIG. 1. Following this, a discussion of the present invention will be presented with reference to FIGS. 2-6. The present invention overcomes the limitations of present day dual mode mechanisms by providing a technique employed in single radio mobile station to communicate over both a circuit switched network and a high speed packetized data network, that does not require use of a tunnel and commensurate back end equipment.

As alluded to above, communications over the two disparate networks can be affected by fielding a mobile station that has two radios, one for the circuit switched network and one for the packetized data network. However, such a solution is expensive and bulky. In addition, such a mobile phone would be less reliable and would require significantly more power than a one radio solution.

Now consider FIG. 1, where a block diagram is presented illustrating a present day single radio dual mode cellular architecture 100 for notifying a dual mode mobile station 101 of an incoming call or other circuit switched event over a packetized data radio link 109. The architecture 100 includes the mobile station 101, which has a circuit switched modem 102 for processing circuit switched cellular applications, and a packetized data modem 104, for processing packetized data applications. The modems 102, 104 are baseband modems and share a single radio 103 for transmission of signals over either the packetized data radio link 109 or a circuit switched radio link 106. The mobile station 101 is thus coupled to a circuit switched base station 107 via the circuit switched radio link 106 and to a packetized data base station 110 over the packetized data radio link 109.

The circuit switched base station 107 is coupled to a mobile switching center 114. The mobile switching center 114 is coupled to an internetworking interface 112. The internetworking interface 112 is coupled to a packetized management entity PME 116 via a packetized data link 115. The mobile switching center 114 routes calls and events to/from a public switched telephone network (PSTN). The PME 116 is coupled to a packetized data switching center 118, which routes data and events to/from a packetized data network such as the Internet.

In operation, circuit switched calls and events over the PSTN are routed by the mobile switching center 114 to the circuit switched base station 107. All control and traffic associated with the calls or other events occurs over the circuit switched radio link 106 are processed by the circuit switched modem 102 within the mobile station 101. Likewise, packetized data and events over the internet are routed by the packetized data switching center 118 to a particular packetized data mobility entity 116 that is interfaced to the packetized base station 110 currently assigned to the mobile station 101. All control and traffic associated with the packetized data or other events occur over the packetized data radio link 109 and are received by the radio 103 and processed by the packetized data modem 104 within the mobile station 101.

Of particular interest are scenarios and circumstances associated with certain present day dual mode configurations, one example of which is a single radio dual mode mobile station 101 that is capable of processing circuit switched calls and other events over a code division multiple access (CDMA) radio link 106 such as might be found in a CDMA2000 1×RTT architecture, and that processes packetized data and other events over a packetized data radio link 109 such as might be found in a Evolved Universal Mobile Telecommunications System Terrestrial Radio Access Network (EUTRAN) architecture. The EUTRAN architecture is more commonly known as the Long Term Evolution (LTE) architecture and will henceforth be referred to as such in this application. As one skilled in the art will appreciate, the CDMA2000 1×RTT circuit switched architecture (or "1×" architecture) is well known in the art for processing circuit switched calls (i.e., voice calls), and the LTE architecture is well known and is presently being fielded in major metropolitan centers around the world as an improvement in packetized data communications capabilities over the currently fielded EV-DO packetized data network. Additionally, well known to those in the art is that LTE is a network that consists exclusively of packetized data, and that employs orthogonal frequency division multiple access (OFDMA) signaling. That is, LTE does not support circuit switched channels such as those used to provide for conventional cellular voice calls and its signaling mechanisms are quite distinct from CDMA. LTE does provide support for so-called voice-over-internet protocol (VoIP) calls, but as one skilled in the art will appreciate, the disadvantages associated with present day VoIP techniques (e.g., jitter) make general use of VoIP in a mobile station 101 highly undesirable.

Going forward in the present application, examples and terminology will be employed from both 1× and LTE applications because these are well appreciated and prevalently fielded technologies that can be effectively employed to teach present day limitations and how the present invention is utilized to overcome these limitations. However, the present inventors note that the scope of the present invention is not to be limited to 1× and LTE, but rather extended to comprehend single radio dual mode cellular architectures where one of the radio links 106 is employed as a circuit switched link having timing and quality of service properties and requirements unique to circuit switched applications, and the other radio link 109 is employed to transfer high speed packetized data.

In specific 1× and LTE terminologies, the mobile station 101 may be referred to as a user equipment (UE) 101. The packetized data mobility entity 116 is referred to as a mobility management entity (MME) 116, which is the primary access node for an LTE network. The MME 116 interfaces to many packetized data base stations 110, which are known as enhanced node Bs (eNBs) 110. The internetworking interface 112 is known as the S102 interface 112, or more commonly as the interworking solution (IWS) 112. The interworking solution 112 is responsible for interfacing a circuit switched network such as 1× to the LTE network via a tunneling mechanism. The packetized data radio link 109 is referred to as the LTE-Uu interface 109. Hence, when packetized data is being transmitted over the packetized data network to the mobile station 101, for purposes of the present application, the circuit switched elements 102, 107, 112 shown in the architecture 100 are effectively idle and the radio 103 is employed to communicate over the packetized data link 109. Packetized data is routed to/from the Internet via the packetized data switching center 118, through the packetized data mobility entity 116, through the packetized data base station 110, and over the packetized data radio link 109 to/from the packetized data modem 104 within the mobile station 101.

But when a circuit switched event (e.g., a call) comes into the mobile switching center 114 that is targeted for the mobile station 101, the mobile station 101 must be notified—over the packetized data radio link 109—that it must, in a timely fashion, cease processing packetized data, and fall back to a circuit switched radio link 106 in order to proceed further, that is, to accept the call. Yet, because circuit switched and packetized data protocols are not equivalent, designers are working to provide techniques and mechanisms that allow for this notification to take place. One such mechanism that is employed in the 1×/LTE environment is the aforementioned tunneling, whereby tunneled circuit switched data (TCSDATA) 121 provides for notification, acknowledgement, and negotiation of circuit switched parameters associated with acceptance of a call and fallback to the circuit switched radio link 106 is encapsulated as the data portion within lower level data packets 120 that are transmitted/received over the packetized data network, which includes links 115, 119, and 109. Hence, as the name implies, circuit switched notification data 121 employs a data packet 120 as a tunnel through which circuit switched parameters are transmitted/received.

This "tunneling" protocol is defined in "E-UTRAN—cdma2000 1× Connectivity and Interworking Air Interface Specification, Version 2.0," April 2011, C.S0097-0, published by the 3rd Generation Partnership Project 2 (3GPP2) (hereinafter, "the '0097 Specification). The protocol that prescribes the circuit switched fallback to 1× mechanism for a single radio mobile station 101 as of the invention date is found in "Circuit Switched (CS) Fallback in Evolved Packet System (EPS); Stage 2, Version 102.1," 2013 Jen. 2004, TS 23272 published by 3GPP2 (hereinafter, "the '272 Specification).

The internetwork interface 112 is a back end special-purpose equipment element that executes the interface between the mobile switching center 114 and the packetized data mobility entity 116, and that is responsible for most of the processing associated with tunneling the circuit switched data 121. Tunneling packets 120 are routed through the mobility entity 116 and the base station 110 over the links 115, 119, 109, but processing of the data 121 is only required at the endpoints 101, 112. As regards present day circuit switched networks such as 1×, there is a great deal of configuration information which must be processed by the endpoints of a circuit switched event in order to guarantee quality of service. In 1×, the protocol layer at with this information is processed is known as the link access control (LAC) layer. The packetized data modem 104 and packetized data base station 110 also include LAC processing elements (not shown) to support layered communications over the packetized data network. However, in order to provide for notification of circuit switched calls and other events over the packetized data network, tunneled LAC (TLAC) layer processing elements are required in both the internetwork interface 112 and the packetized data modem 104. Thus, the packetized data modem 104 includes a TLAC processor 105 and the internetwork interface 112 includes a TLAC processor 113. These processors 105, 113, among other functions that will be described below, perform the LAC layer processing that is required in the packetized data modem 104 and internetwork interface 112, respectively, to provide for notification of circuit switched calls and other events over the packetized data network. Certainly, since the primary purpose of the internetwork interface 112 is to interface the circuit switched network to the packetized data network, it follows then that processing of LAC layer information is necessary. In fact, the sole purpose of the internetwork interface 112 is to provide for tunneling of circuit switched data over the packetized data network.

As one skilled in the art will further appreciate, the hardware and software associated with tunneling information related to circuit switched calls and events over the packetized data network is limiting and cumbersome at best. Special purpose equipment (e.g., internetwork interface 112) is required to bridge the circuit switched data to the mobile station 101 over the packetized data tunnel, and thus the present inventors have observed that such equipment contributes to increased power consumption and decreased reliability of the communications system as a whole.

The present invention overcomes the above noted problems, and others, by providing a technique for communicating over a circuit switched network and a high speed packetized data network in a single radio dual mode mobile station. Mechanisms are disposed within a mobile station according to the present invention to allow for communication over the two networks, thus alleviating the requirement for a dual radio mobile station and an internetwork interface 112. The present invention will now be discussed with reference to FIGS. 2-6.

Figure 2:
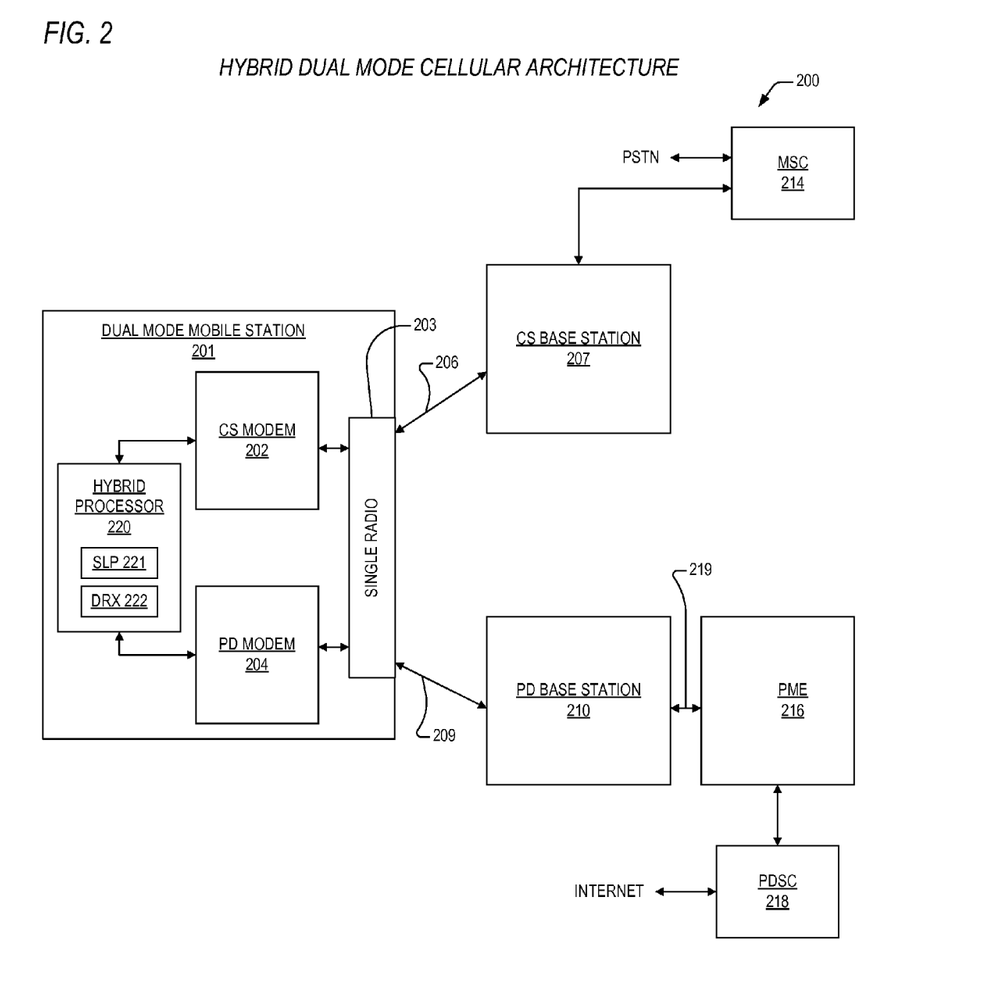
FIG. 2 is a block diagram depicting single radio dual mode architecture according to the present invention.

Turning to FIG. 2, a block diagram is presented depicting single radio dual mode architecture 200 according to the present invention. The architecture 200 includes a dual mode mobile station 201 according to the present invention, which has a circuit switched modem 202 for processing circuit switched cellular applications, and a packetized data modem 204, for processing packetized data applications. The modems 202, 204 are baseband modems and share a single radio 203 for transmission of signals over either a packetized data radio link 209 or a circuit switched radio link 206. The mobile station 201 is thus coupled to a circuit switched base station 207 via the circuit switched radio link 206 and to a packetized data base station 210 over the packetized data radio link 209.

The circuit switched base station 207 is coupled to a mobile switching center 214. The mobile switching center 114 routes calls and events to/from a public switched telephone network (PSTN).

The packetized base station 210 is coupled to a packetized data mobility entity (PME) via link 219. The PME 216 is coupled to a packetized data switching center 218, which routes data and events to/from a packetized data network such as the Internet.

In operation, circuit switched calls and events over the PSTN are routed by the mobile switching center 214 to the circuit switched base station 207. All control and traffic associated with the calls or other events occurs over the circuit switched radio link 206 are processed by the circuit switched modem 202 within the mobile station 201. Likewise, packetized data and events over the internet are routed by the packetized data switching center 218 to a particular packetized data mobility entity 216 that is interfaced to the packetized base station 210 currently assigned to the mobile station 201. All control and traffic associated with the packetized data or other events occur over the packetized data radio link 209 and are received by the radio 203 and processed by the packetized data modem 204 within the mobile station 201.

As is noted above, the present application deals with scenarios and circumstances associated a single radio dual mode mobile station 201 that is communicates over the circuit switched radio link 206 and the packetized data radio link 209, yet that does not require special purpose hardware and software to switch between the two links 206, 209, such as is exemplified by the interworking solution 112 of FIG. 1. And to clearly teach aspects of the present invention, examples and terminology will be employed from both 1× and LTE applications. Yet again, the present inventors note that the scope of the present invention is not to be limited to 1× and LTE, but rather extended to comprehend single radio dual mode cellular architectures where one of the radio links 206 is employed as a circuit switched link having timing and quality of service properties and requirements unique to circuit switched applications, and the other radio link 209 is employed to transfer high speed packetized data.

At a summary level, the present inventor has observed that aspects of both types of networks may be exploited that allow the mobile station 201 to switch between communications over the two networks without a loss of quality of service or of data. More specifically, as one skilled in the art will appreciate, both networks provide for so-called sleep cycles that allow a mobile station 201 to deactivate radios, transceivers (not shown), and other hardware (not shown) therein, thus enabling the mobile station 201 to decrease power consumption, thus extending battery life. It is not the purpose of the present application to provide an in-depth discussion of the particular sleep cycle mechanisms provide for by 1× and LTE, for these mechanisms may be found in readily available specifications and standards. Thus, it is sufficient herein to note that 1× provides for paging of a given mobile station within a designated slot according to a paging slot cycle (128 milliseconds, in one embodiment) where, if it is indicated that the mobile station 201 is not being paged, the mobile station 201 may go back into a sleep mode until its next paging slot cycle. The slot number within the sleep cycle corresponding to a particular mobile station 201 is assigned by the circuit switched base station 207. Likewise, LTE provides for a substantially similar mechanism where, if the mobile station 201 is not being paged, then it goes back into a sleep mode until its next paging slot. In specific LTE terms, this sleep cycle is known as discontinuous reception (DRX), and DRX is specified in terms of the number of radio frames in the paging cycle. If there are 32 radio frames in the paging cycle, then the mobile station 201 needs to wake up and check its paging channel every 0.32 milliseconds. If there are 128 radio frames in the paging cycle, then the mobile station is only required to wake up every 128 milliseconds to check for LTE events. The frame number within the paging cycle corresponding to a particular mobile station 201 is assigned by the packetized base station 210.

The present invention thus provides for a mobile station that includes a hybrid processor 220 to monitor both the 1× sleep cycle and the LTE sleep cycle. Accordingly, a 1× sleep timer store 221 is disposed within the hybrid processor 220, along with an LTE DRX timer store 222. Values of the stores 221-222 respectively indicate when the mobile station 201 is allowed to enter respective sleep modes.

According to the present invention, the hybrid processor 220 directs the packetized data modem 204 to communicate over the packetized radio link 209 only when the value of the 1× sleep timer store 221 indicates that the mobile station 201 is allowed to be in a 1× sleep mode. When the 1× sleep timer store 221 indicates that the mobile station must wake up and monitor its paging channel, or when network or mobile originated calls are required, the hybrid processor 220 directs the packetized data modem 204 to suspend communications over the packetized data radio link 209 using conventional mechanisms, such as the well known LTE extended service request, prior to switching over to communications over the circuit switched radio link 206. When the network or mobile originated calls are terminated, the hybrid processor 220 directs the packetized data modem 204 to re-establish communications over the packetized data radio link 209 using conventional mechanisms to complete interrupted data transfers.

Accordingly, the mobile station according to the present invention employs a pseudo multiplexing scheme to switch between the circuit switched radio link 206 and the packetized data radio link 209, using a single radio 203, where switching is based on paging sleep cycles of the respective networks, and where priority is given to communications over the circuit switched radio link 206.

The mobile station 201 according to the present invention is configured to perform the functions and operations as discussed above. The mobile station 201 may comprise logic, circuits, devices, or microcode (i.e., micro instructions or native instructions), or a combination of logic, circuits, devices, or microcode, or equivalent elements that are employed to execute the functions and operations according to the present invention as noted. The elements employed to accomplish these operations and functions within the mobile station 201 may be shared with other circuits, microcode, etc., that are employed to perform other functions and/or operations within the mobile station 201. According to the scope of the present application, microcode is a term employed to refer to a plurality of micro instructions. A micro instruction (also referred to as a native instruction) is an instruction at the level that a unit executes. For example, micro instructions are directly executed by a reduced instruction set computer (RISC) microprocessor. For a complex instruction set computer (CISC) microprocessor such as an x86-compatible microprocessor, x86 instructions are translated into associated micro instructions, and the associated micro instructions are directly executed by a unit or units within the CISC microprocessor.

Figure 3:
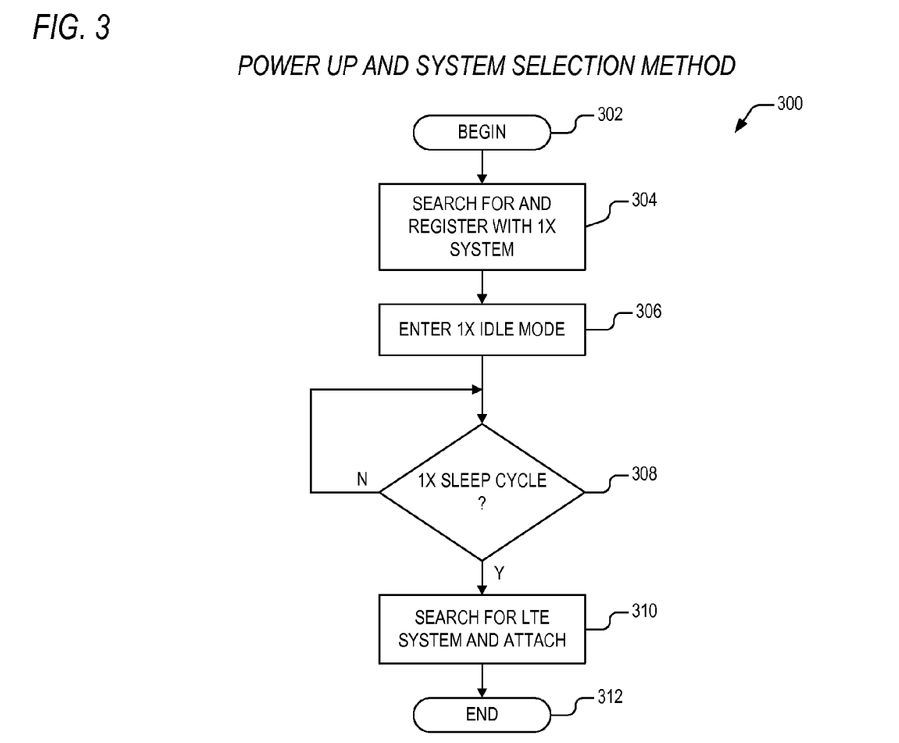
FIG. 3 is a flow diagram featuring a method according to the present invention for power up and system selection.

Referring now to FIG. 3, a flow diagram 300 is presented featuring a method according to the present invention for power up and system selection. Flow begins at block 302, where a single radio dual mode mobile station 201 according to the present invention is turned on. Flow then proceeds to bock 304.

At block 304, the hybrid processor 220 within the mobile station 201 directs the circuit switched modem 202 to access the circuit switched radio link 206 to search for and register with a 1× network. As part of 1× registration, the value of the 1× sleep timer store 221 is established. Flow then proceeds to block 306.

At block 306, the mobile station enters into a 1× idle mode, waking to check its paging channel as described in decision block 308 below.

At decision block 308, the hybrid processor monitors the 1× sleep timer store 221 and determines if the mobile station 201 should wake or continue 1× sleep. If it is indicated that the mobile station should wake, then flow proceeds to decision block 308. If it is indicated that the 1× sleep cycle should continue, then flow proceeds to block 310.

At block 310, the hybrid processor 220 directs the packetized data modem 204 to access the packetized data radio link 209 to search for and attach to an LTE network. As part of LTE attachment, the value of the DRX timer store 222 is established. Flow then proceeds to block 312.

At block 312, the method completes.

Figure 4:
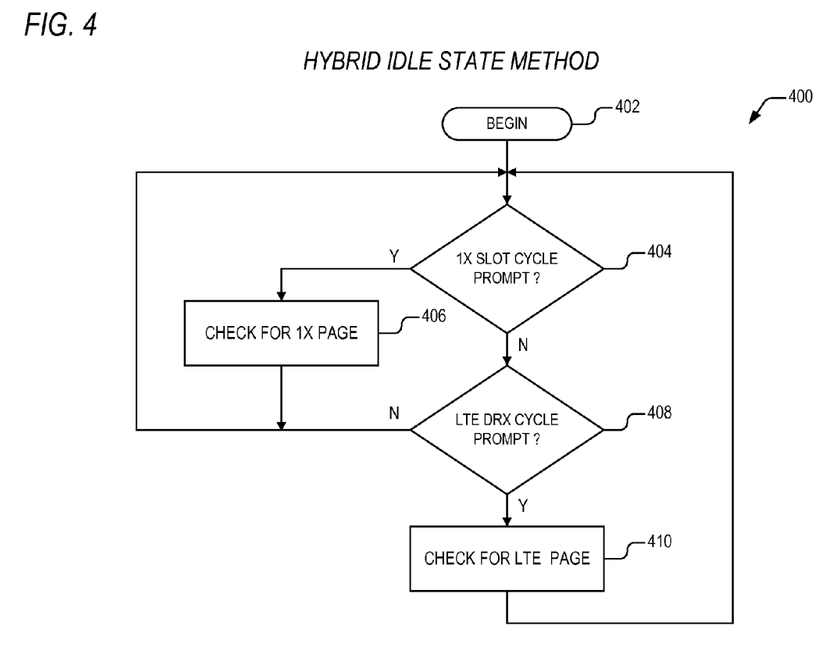
FIG. 4 is a flow diagram showing a method for operating a mobile station according to the present invention in 1× and LTE idle modes.

Turning to FIG. 4, a flow diagram 400 is presented showing a method for operating a mobile station 201 according to the present invention in 1× and LTE idle modes. Flow begins at block 402, where a powered up mobile phone is in both 1× and LTE idle modes. Flow then proceeds to decision block 404.

At decision block 404, the hybrid processor 220 accesses the 1× sleep timer store 221 to determine if the mobile station 201 should remain in 1× sleep state or if it should wake. If the 1× sleep timer store 221 indicates that sleep state is prescribed, then flow proceeds to decision block 408. If the mobile station 201 should wake in 1× mode, then flow proceeds to block 406.

At block 406, the hybrid processor 220 directs the circuit switched modem 202 to access an assigned 1× paging channel over the circuit switched radio link 206 to check if the mobile station 201 is being paged. Flow then proceeds to decision block decision block 404.

At decision block 408, the hybrid processor 220 accesses the DRX timer store 222 to determine if the mobile station 201 should remain in LTE sleep state or if it should wake. If the DRX timer store 222 indicates that sleep state is prescribed, then flow proceeds to decision block 404. If the mobile station 201 should wake in LTE mode, then flow proceeds to block 410.

At block 410, the hybrid processor 220 directs the packetized data modem 204 to access an assigned LTE paging frame over the packetized data radio link 209 to check if the mobile station 201 is being paged. Flow then proceeds to decision block decision block 404.

The process continues as described above until events occur that cause the mobile station to exit either of the idle modes.

Figure 5:
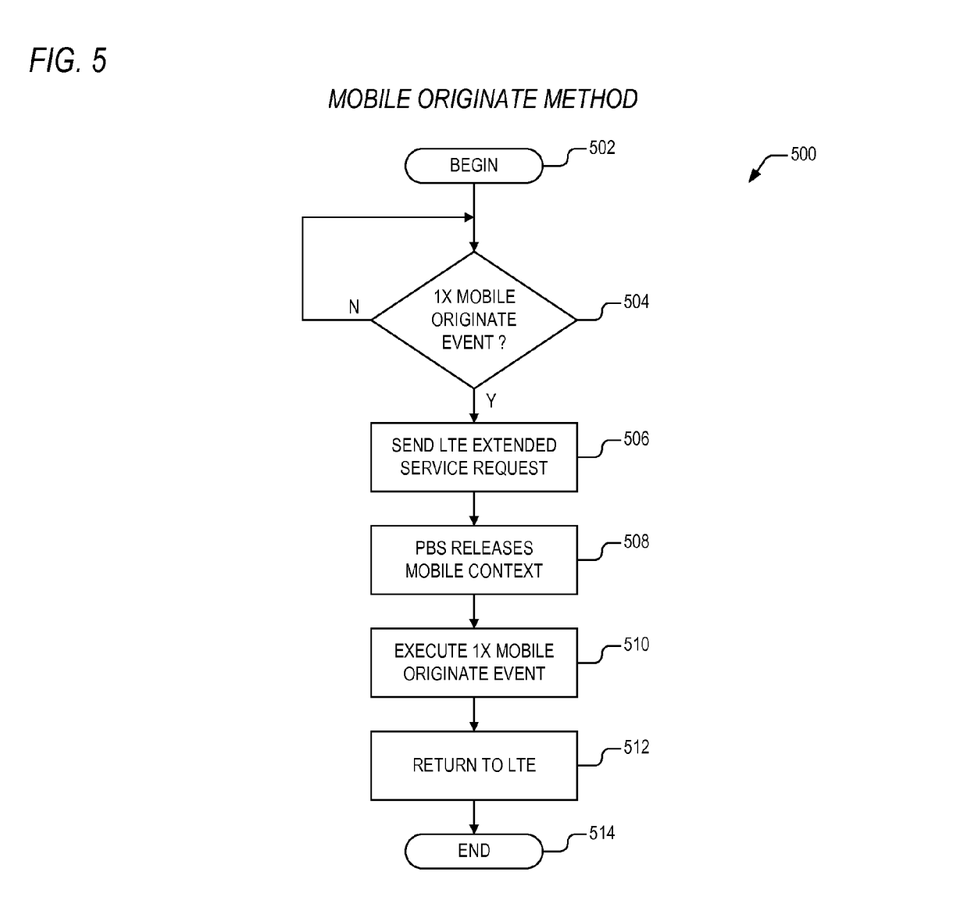
FIG. 5 is a flow diagram illustrating a method for originating a 1× call event using a mobile station according to the present invention.

Now referring to FIG. 5, a flow diagram 500 is presented illustrating a method for originating a 1× call event using a mobile station 201 according to the present invention. Flow begins at block 502, where the mobile station is in both 1× and LTE idle modes. Flow then proceeds to decision block 504.

At decision block 504, an evaluation is made to determine if a 1× mobile originate event (e.g., a mobile initiate call) is required. If so, then flow proceeds to block 506. If not, then flow proceeds to block 504.

At block 506, the hybrid processor 220 directs the packetized data modem 204 to send an LTE extended service request message to the packetized data base station 210 over the packetized data radio link 209. The extended service request message allows the mobile station 201 to retain its protocol status with LTE. Flow then proceeds to block 508.

At block 508, the base station 210 releases mobile context for the mobile station 201. Flow then proceeds to block 510.

At block 510, the hybrid processor 220 directs the circuit switched modem 202 to originate the 1× event over the circuit switched radio link 206. Flow then proceeds to block 512 after completion of the 1× originate event.

At block 512, the hybrid processor 220 directs the packetized data modem 204 to access the packetized data radio link 209 in order to re-establish context with the LTE network. Flow then proceeds to block 514.

At block 514, the method completes.

Figure 6:
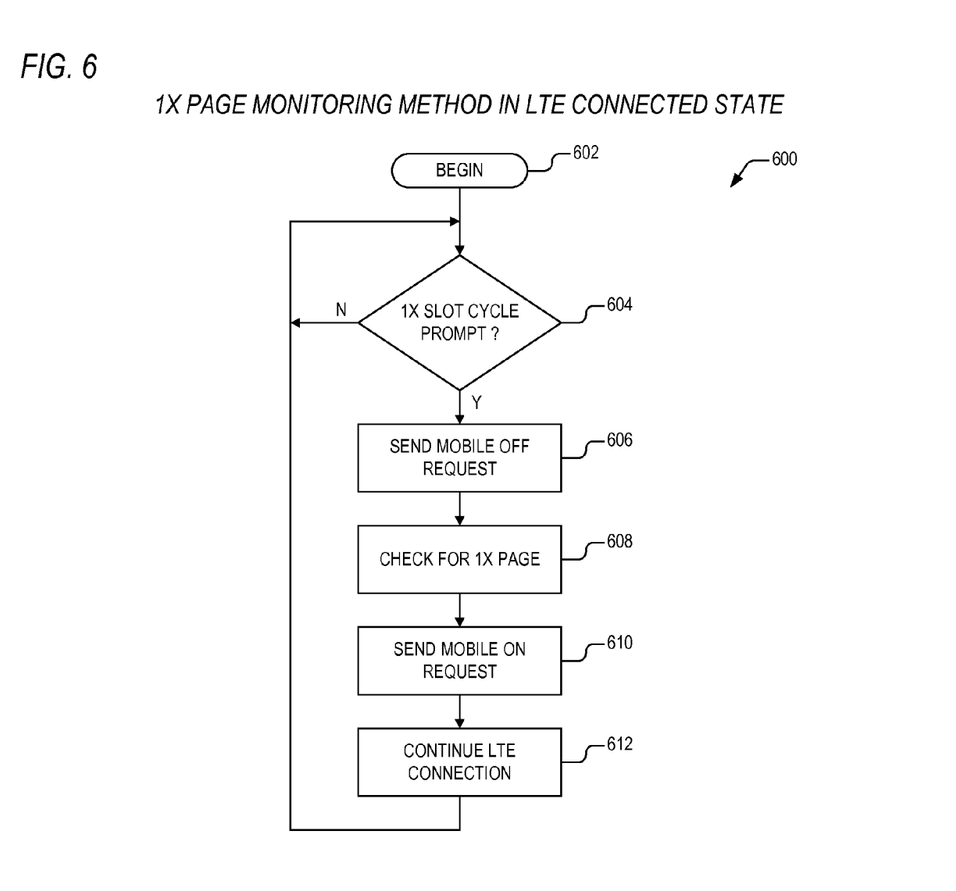
FIG. 6 is a flow diagram detailing a method according to the present invention for 1× page monitoring when a mobile station is in an LTE connected state.

Referring to FIG. 6, a flow diagram 600 is presented detailing a method according to the present invention for 1× page monitoring when a mobile station 201 is in an LTE connected state. Flow begins at block 602, where the mobile station 201 is actively transmitting or receiving data over the packetized data radio link 209. Flow then proceeds to decision block 604.

At decision block 604, the hybrid processor 220 evaluates the 1× sleep timer to determine whether or not the mobile station 201 should wake in 1× mode to check for a page. If so, then flow proceeds to block 606. If not, then flow proceeds to decision block 604, as the mobile station 201 continues communications over the packetized data radio link 209.

At block 606, the hybrid processor 220 directs the packetized data modem 204 to send a mobile off request to the packetized data base station 210 over the packetized data radio link 209. The present inventors note that such a request message may be embodied as a proprietary message or as a conventional message that informs the base station 210 that the mobile station 201 is ceasing communications over the packetized data radio link 209. In one embodiment, the mobile off request is encapsulated within an LTE uplink info transfer message at the radio resource connection (RRC) protocol layer. Flow then proceeds to block 608.

At block 608, the hybrid processor 220 directs the circuit switched modem 202 to access the 1× paging channel in order to check for a page for the mobile station 201. When the mobile station 201 goes back into a 1× sleep mode, flow then proceeds to block 610.

At block 610, the hybrid processor 220 directs the packetized data modem 204 to send a mobile on request to the packetized data base station 210 over the packetized data radio link 209. The present inventors note that such a request message may be embodied as a proprietary message or as a conventional message that informs the base station 210 that the mobile station 201 is re-establishing communications over the packetized data radio link 209. In one embodiment, the mobile on request is encapsulated within an LTE uplink info transfer message at the radio resource connection (RRC) protocol layer. Flow then proceeds to block 612.

At block 612, following re-establishment of connectivity with the LTE network, the hybrid processor 220 directs the packetized data modem 204 to continue the interrupted LTE connection over the packetized data radio link 209. Flow then proceeds to decision block 604.

Although the present invention and its objects, features, and advantages have been described in detail, other embodiments are encompassed by the invention as well.

Portions of the present invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, a microprocessor, a central processing unit, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the invention are typically encoded on some form of program storage medium or implemented over some type of transmission medium. The program storage medium may be electronic (e.g., read only memory, flash read only memory, electrically programmable read only memory), random access memory magnetic (e.g., a floppy disk or a hard drive) or optical (e.g., a compact disk read only memory, or "CD ROM"), and may be read only or random access. Similarly, the transmission medium may be metal traces, twisted wire pairs, coaxial cable, optical fiber, or some other suitable transmission medium known to the art. The invention is not limited by these aspects of any given implementation.

The particular embodiments disclosed above are illustrative only, and those skilled in the art will appreciate that they can readily use the disclosed conception and specific embodiments as a basis for designing or modifying other structures for carrying out the same purposes of the present invention, and that various changes, substitutions and alterations can be made herein without departing from the scope of the invention as set forth by the appended claims.

What is claimed is:

1. An apparatus for communicating over a circuit switched network and a packetized data network, the apparatus comprising:
   a packetized data modem, configured to communicate with the packetized data network over a packetized data radio link via a radio;

a circuit switched modem, configured to communicate with the circuit switched network over a circuit switched radio link via said radio; and a hybrid processor, configured to monitor a circuit switched sleep cycle and a packetized data sleep cycle, and configured to direct said packetized data modem and said circuit switched modem to switch between the networks according to said sleep cycles by prioritizing communications with the circuit switched network above communications with the packetized data network, wherein:

upon power up, said hybrid processor is further configured to direct said circuit switched modem to search for the circuit switched network and then register with the circuit switched network, subsequent to registration with the circuit switched network, the hybrid processor is further configured to direct said packet switched modem to attach to the packetized data network.

2. The apparatus as recited in claim 1, wherein said modems are disposed within a dual mode mobile station, and wherein said circuit switched modem is compatible with CDMA2000 1×RTI (1×) protocol, and wherein said packetized data modem is compatible with Long Term Evolution (LTE) protocol.

3. The apparatus as recited in claim 2, wherein said hybrid processor comprises a 1× sleep timer store, and wherein said hybrid processor monitors a value within said 1× sleep timer store that indicates said circuit switched sleep cycle, and wherein if a 1× waking state is indicated, said hybrid processor directs said packetized data modem to cease communications with the packetized data network and directs said circuit switched modem to initiate communications with the circuit switched network.

4. The apparatus as recited in claim 3, wherein said hybrid processor further comprises a discontinuous reception (DRX) timer store, and wherein said hybrid processor monitors a value within said DRX timer store that indicates said packetized data switched sleep cycle, and wherein if an LTE waking state is indicated, said hybrid processor directs said LTE modem to initiate communications with the packetized data network only if said 1× waking state is not indicated.

5. The apparatus as recited in claim 4, wherein, if said dual mode mobile station is in a 1× idle mode and an LTE idle mode, communications over the circuit switched network comprise monitoring a 1× paging channel at an assigned slot, and communications over the packetized data network comprise monitoring an LTE paging channel at an assigned frame.

6. The apparatus as recited in claim 4, wherein, if said dual mode mobile station originates a 1× originate event, said hybrid processor directs said packetized data modem to communicate with the packetized data network to release the dual mode mobile station prior to executing said 1× originate event.

7. The apparatus as recited in claim 4, wherein, if said dual mode mobile station is in an LTE connected state and a 1× idle state, when said 1× waking state is indicated, said hybrid processor directs said packetized data modem to send a mobile off request over the packetized data radio link prior to directing said circuit switched modem to check for a 1× page over said circuit switched radio link.

8. An apparatus for communicating over a circuit switched network and a packetized data network, the apparatus comprising:

a dual mode mobile station having a single radio, said dual mode mobile station comprising:

a packetized data modem, configured to communicate with the packetized data network over a packetized data radio link via said single radio;

a circuit switched modem, configured to communicate with the circuit switched network over a circuit switched radio link via said single radio; and a hybrid processor, configured to monitor a circuit switched sleep cycle and a packetized data sleep cycle, and configured to direct said packetized data modem and said circuit switched modem to switch between the networks according to said sleep cycles by prioritizing communications with the circuit switched network above communications with the packetized data network, wherein:

upon power up, said hybrid processor is further configured to direct said circuit switched modem to search for the circuit switched network and then register with the circuit switched network, subsequent to registration with the circuit switched network, the hybrid processor is further configured to direct said packet switched modem to attach to the packetized data network.

9. The apparatus as recited in claim 8, wherein said circuit switched modem is compatible with CDMA2000 1×RTI (1×) protocol, and wherein said packetized data modem is compatible with Long Term Evolution (LTE) protocol.

10. The apparatus as recited in claim 9, wherein said hybrid processor comprises a 1× sleep timer store, and wherein said hybrid processor monitors a value within said 1× sleep timer store that indicates said circuit switched sleep cycle, and wherein if a 1× waking state is indicated, said hybrid processor directs said packetized data modem to cease communications with the packetized data network and directs said circuit switched modem to initiate communications with the circuit switched network.

11. The apparatus as recited in claim 10, wherein said hybrid processor further comprises a discontinuous reception (DRX) timer store, and wherein said hybrid processor monitors a value within said DRX timer store that indicates said packetized data switched sleep cycle, and wherein if an LTE waking state is indicated, said hybrid processor directs said LTE modem to initiate communications with the packetized data network only if said 1× waking state is not indicated.

12. The apparatus as recited in claim 11, wherein, if said dual mode mobile station is in a 1× idle mode and an LTE idle mode, communications over the circuit switched network comprise monitoring a 1× paging channel at an assigned slot, and communications over the packetized data network comprise monitoring an LTE paging channel at an assigned frame.

13. The apparatus as recited in claim 11, wherein, if said dual mode mobile station originates a 1× originate event, said hybrid processor directs said packetized data modem to communicate with the packetized data network to release the dual mode mobile station prior to executing said 1× originate event.

14. The apparatus as recited in claim 11, wherein, if said dual mode mobile station is in an LTE connected state and a 1× idle state, when said 1× waking state is indicated, said hybrid processor directs said packetized data modem to send a mobile off request over the packetized data radio link prior to directing said circuit switched modem to check for a 1× page over said circuit switched radio link.

15. A method for communicating over a circuit switched network and a packetized data network, the method comprising:

via a packetized data modem, communicating with the packetized data network over a packetized data radio link using a single radio;

via a circuit switched modem, communicating with the circuit switched network over a circuit switched radio link using the single radio; and via a hybrid processor, employing a pseudo multiplexing scheme to switch between the circuit switched radio network and the packetized data network, using the single radio, wherein:

upon power up, said hybrid processor is further configured to direct said circuit switched modem to search for the circuit switched network and then register with the circuit switched network, subsequent to registration with the circuit switched network, the hybrid processor is further configured to direct said packet switched modem to attach to the packetized data network.

16. The method as recited in claim 15, wherein the modems are disposed within a dual mode mobile station, and wherein the circuit switched modem is compatible with CDMA2000 1×RTI (1×) protocol, and wherein the packetized data modem is compatible with Long Term Evolution (LTE) protocol.

17. The method as recited in claim 16, wherein the hybrid processor comprises a 1× sleep timer store, and wherein the hybrid processor monitors a value within the 1× sleep timer store that indicates the circuit switched sleep cycle, and wherein if a 1× waking state is indicated, the hybrid processor directs the packetized data modem to cease communications with the packetized data network and directs the circuit switched modem to initiate communications with the circuit switched network.

18. The method as recited in claim 17, wherein the hybrid processor further comprises a discontinuous reception (DRX) timer store, and wherein the hybrid processor monitors a value within the DRX timer store that indicates the packetized data switched sleep cycle, and wherein if an LTE waking state is indicated, the hybrid processor directs the LTE modem to initiate communications with the packetized data network only if the 1× waking state is not indicated.

19. The method as recited in claim 18, wherein, if the dual mode mobile station is in a 1× idle mode and an LTE idle mode, communications over the circuit switched network comprise monitoring a 1× paging channel at an assigned slot, and communications over the packetized data network comprise monitoring an L TE paging channel at an assigned frame.

20. The method as recited in claim 18, wherein, if the dual mode mobile station originates a 1× originate event, the hybrid processor directs the packetized data modem to communicate with the packetized data network to release the dual mode mobile station prior to executing the 1× originate event.

21. The method as recited in claim 18, wherein, if the dual mode mobile station is in an LTE connected state and a 1× idle state, when the 1× waking state is indicated, the hybrid processor directs the packetized data modem to send a mobile off request over the packetized data radio link prior to directing the circuit switched modem to check for a 1× page over the circuit switched radio link.

* * * * *